Feb. 14, 1933.　　　L. C. KARRICK ET AL　　　1,897,259
APPARATUS FOR CALCINING GYPSUM
Filed Jan. 30, 1928　　2 Sheets-Sheet 1
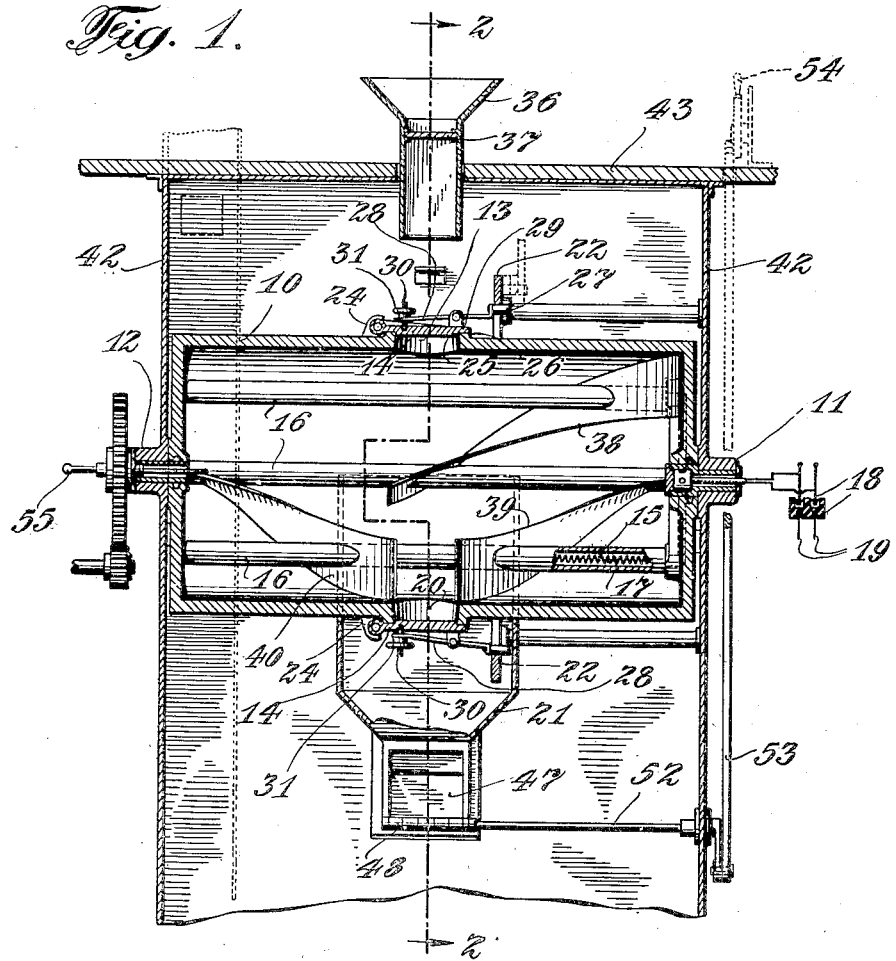
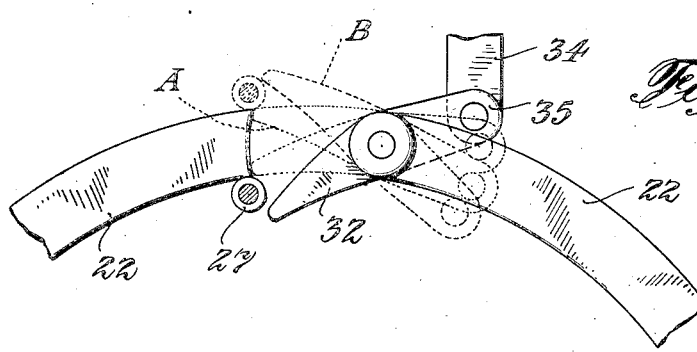

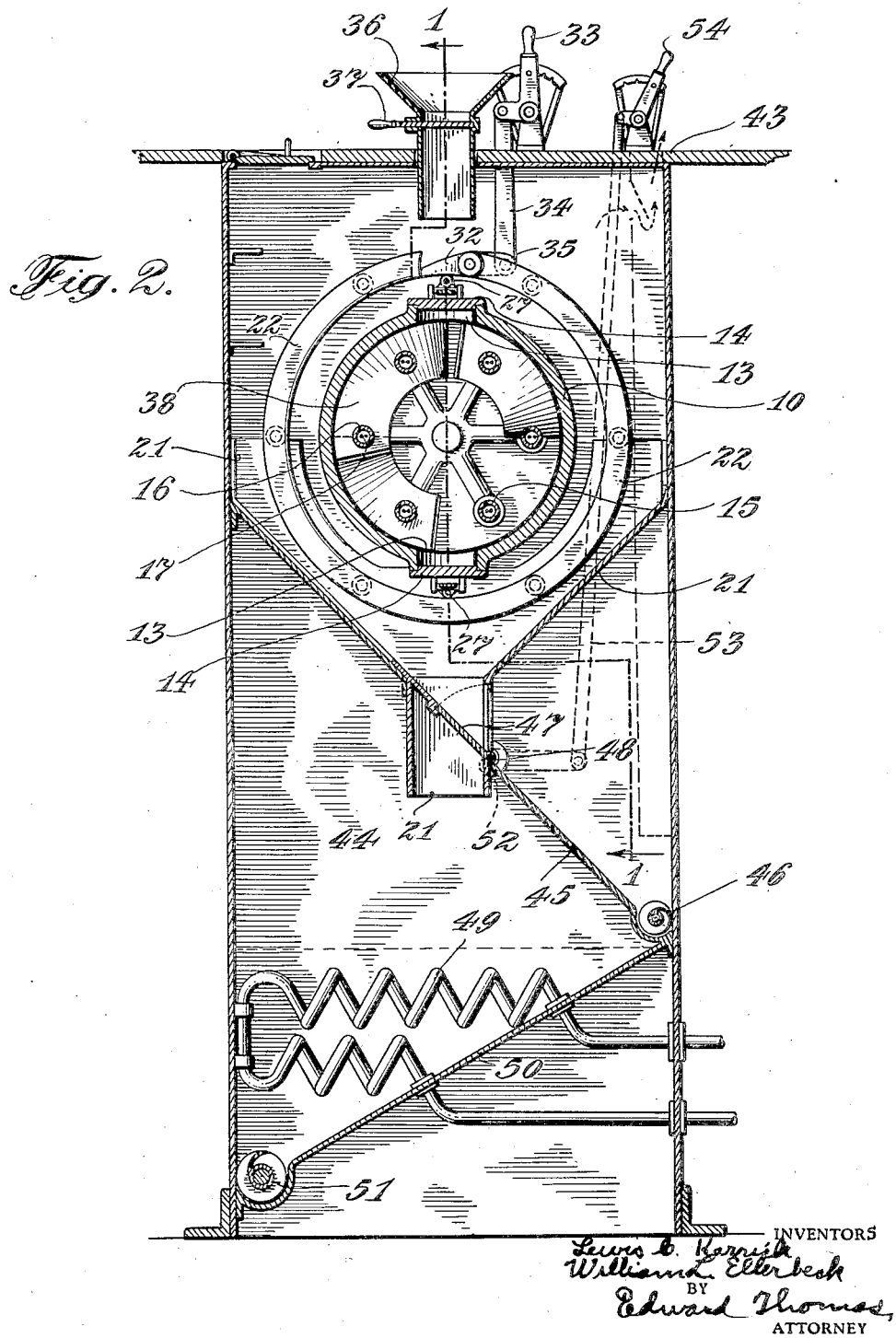

Patented Feb. 14, 1933

1,897,259

UNITED STATES PATENT OFFICE

LEWIS C. KARRICK AND WILLIAM LEON ELLERBECK, OF SALT LAKE CITY, UTAH

APPARATUS FOR CALCINING GYPSUM

Application filed January 30, 1928. Serial No. 250,463.

This invention relates to a new form of calcined plaster and to kilns and processes suitable for calcining gypsum to yield the plaster. One form of the apparatus is herein illustrated as embodied in an electrically heated kiln.

Accurate control of the temperature is vital to the production of a uniform and satisfactory calcined gypsum. According to the usual practice an externally fired kettle is used and an attempt is made to keep the temperature of the ground raw gypsum within certain rather narrow limits. During the application of heat the gypsum is continually stirred by paddles and chains fastened to a rotating vertical shaft. This process of agitation is uncertain and consumes a large amount of power. In the hands of skilled operators this apparatus can be made to yield a fairly uniform material, but the paddle method of agitation is unscientific and uncertain and some of the gypsum in the upper section of the kettle may be under-calcined and some held unduly near or on the overheated kettle bottom is often over-calcined, so that the properties of the product are usually inferior to those of the product which can be obtained by our invention.

Moreover some of the calcium carbonate, nearly always present in commercial gypsum, is partly calcined to quick lime, and the presence of caustic lime is often objectionable. Besides this some undesirable calcium sulphide is often formed either by reaction of the gypsum with organic matter present or with carbonaceous material filtering in through leaks in flues or cracks in the kettle bottom. Sometimes undesirable sulphurous acid is released owing to local reactions within the mass.

According to the present invention these and other difficulties and objections are overcome. The gypsum mass is continuously and evenly agitated and circulated, all particles of the mass being heated identically.

It has been found advantageous to heat the gypsum in a closed kiln provided with means for intermittently releasing the steam given off, thus suddenly releasing the pressure. The product thus produced by continuously disrupting the crystals by sudden release of pressure has a materially greater cementing value and sand-carrying capacity than the kettle-made product. Other features and advantages will hereinafter appear.

In the accompanying drawings Figure 1 is a sectional longitudinal view through a kiln and its mountings. Figure 2 is a similar transverse view of the same. Figure 3 is a detail view of part of a cam ring for opening and closing the kiln.

The kiln in the form shown consists of a metal lined barrel 10 mounted on trunnions 11 and 12. To charge it it is turned until a central opening 13 on its periphery stands uppermost so that ground raw gypsum may be delivered into the interior of the barrel 10. Usually the kiln is charged with enough raw gypsum to more than half fill it. Then a cover 14 is caused to close over the opening, the kiln is started revolving and the heat turned on.

For heating the gypsum the kiln is provided with internal heating means, herein illustrated as electrical resistance members 15. The electrical resistance members may be in the form of rods or pipes 16 extending longitudinally of the kiln provided with covered electric heating resistance windings 17 connected to commutator or brush or other suitable connections such as revolving mercury contacts 18. The heat, in this form of the invention, is derived from an electric current provided by mains 19.

In addition to the opening 13 there may be a second opposite normally closed opening 20, from which the calcined gypsum or plaster is discharged into a suitable hopper 21, so that it may be stored or packed.

After the kiln has received a charge of raw ground gypsum and the opening 13, is closed, thus closing the kiln, the heating is begun. The heating devices are regulated to maintain the mass for the necessary time within the theoretically critical temperatures for driving off the desired amount of the water. The revolving of the kiln barrel circulates the powdered gypsum around the heating devices and uniformly mixes the gypsum so that the heat is uniformly distributed with the result that the highest quality product may be obtained even by ordinary labor.

In order to control the heating and to vent the steam released from the hot gypsum a valve is provided for the kiln. In the form here shown the valve is normally closed and is automatically released every time the turning of the kiln brings it to its most elevated position. For this purpose there is provided a fixed cam ring 22, which is shown as about midway of the length of the kiln, adjacent the openings 13 and 20 which may also serve as the valves.

For this purpose each opening has a cover 14 pivoted in a lug 24 on the body of the kiln. Each cover has a rabbeted edge 25 fitting the opening closely and is held down on the opening flange 26 by a cam follower 27 running on the inside of the ring 22. The followers are on the ends of strong leaf springs 28, pivoted intermediate their ends on ears 29 on the covers, and embrace adjusting screws 30 on which turn adjustable screws or nuts 31, to vary the tension by which each follower 27 holds its cover 14 against the kiln.

To enable the covers 14 to serve as relief valves, the cam 22 is provided with a movable section at its uppermost point. The section 32 normally occupies the position A of Figure 3 with the result that every time a follower 27 reaches the uppermost point in the revolution of the kiln it releases its spring 28 and permits escape of the steam generated by heating the gypsum. This mechanically varies the vapor pressure of the material being heated.

The further turning of the kiln causes the follower to ride down the section 32 to the internal surface of the cam 22. Any desired number of openings 13 may be provided, and when each is closed by the section 32, its spring allows its cover 14 to adjust itself on any gypsum which may settle on the flange 26.

When it is desired to charge the kiln the section 32 is swung by its control arm 33, a connecting rod 34, and bell crank 35 to the full line position of Figure 3, so that the oncoming follower 27 rides onto the outside of the ring 22, thus holding its cover 14 open, enabling it to be opened wide for charging the kiln by a hopper 36 provided with a slide-valve gate 37.

When the kiln is charged the follower 27 is brought under the section 32, the section 32 is then set at the dotted line B position, and the kiln turned so the follower 27 rides down under the ring 22 closing the kiln. The kiln then rotates forward, and is heated by the coils 17. The ground gypsum is continuously turned over by the rotation and is more thoroughly mixed by suitable baffles 38, 39, 40 which spring from the ends of the kiln and incline toward the center so that the gypsum slides down the baffles. Preferably there is a pair of baffles 39 and 40 which extend part way from the periphery to the center and terminate practically at the edge of one or both openings 13 and 20 in order that the kiln in rotating will readily discharge its contents through the openings 13 and 20. Other similar peripheral baffles 38 (only one being shown) preferably extend from the ends beyond the middle of the kiln so the swirling gypsum tends to be carried from each end more than half way to the other end thus ensuring perfect mixing during calcination.

For emptying the kiln the section 32 is held in its depressed (full line) position for one revolution then returned to original position while the kiln is revolving, which permits the kiln to empty. This is a normally dusty operation even though the falling gypsum falls into a hopper 21 fitting the periphery of the kiln midway as closely as the mechanism allows. The kiln and its mechanism are therefore shown as enclosed in a housing having sides 42 and a top formed by the operator's floor 43. This keeps the dust confined and conserves heat.

In order to keep any uncalcined gypsum out of the bin 44 into which the hopper and chute 21 delivers the calcined gypsum, the connecting chute 21 is mounted in a slanting floor 45, extending entirely from one wall 42 to the other. The floor 45 carries the dust down to a conveyor 46 which carries it off for further calcining or other disposal, as desired.

The hopper and chute 21 is formed with wall 47 hinged on the lower side with its floor 45 so that the wall 47 may normally lie as part of the floor and close the hopper and chute 21 from communicating with bin 44. When the kiln is to be cleared the wall 47 is swung up around its hinge 48, opening the hopper and chute 21 so the calcined gypsum is directed into the bin 44. During the operation the calcined gypsum is prevented from running into space occupied by the conveyor 46.

Here the hot gypsum comes in contact with coils of pipes diagrammatically shown as 49 through which air or water flows. These coils absorb heat at a regulated rate and the contained air or water if used may be used in preheating the gypsum going to the hopper 36 or for other useful purposes.

The bottom of the bin 44 has a slanting floor 50 down which the cooled calcined gypsum flows to a conveyor 51 which carries it to storage or to packing machinery.

The side or door 47 may be operated by a rod 52 and a link 53 connected to a handle 54 on the floor 43 like the handle 33.

The kiln 10 is preferably covered with a heat insulating layer to conserve heat, and the electrical connections to the heaters 17 may lie within this layer.

It is found that a given gypsum calcined under the foregoing conditions is capable of carrying from ten per cent to over twenty per cent more sand in a mortar mix of a determined consistency or plasticity than when the gypsum is calcined by the kettle method. Moreover it is found that calcined gypsum thus produced requires upward of five per cent more of water than does kettle calcined gypsum when subjected to the usual laboratory slumping test. Under the microscope the crystals of the gypsum calcined according to the procedure just described are symmetrical with rounded edges instead of irregular with jagged edges.

Owing to the close control of calcination attained by this invention no local overheating of any part of the charge is possible and it will be maintained well below the temperature at which any carbonate of lime begins to give up any carbon dioxide. The kiln therefore provides means for producing gypsum products free from deleterious lime or calcium sulphide or sulphur dioxide. Moreover after or during the time that the gypsum is being calcined, accelerators, retarders, fibres, colors and other ingredients may be added to the kiln contents and the kiln then used as a mixer to obtain a uniformly mixed product. Moreover the bin 44 as used provides for cooling under regulated conditions.

One or both trunnions may be made hollow and the opening continued into the axis to provide for measuring the internal temperature by a thermometer or thermocouple 55.

Having thus described certain embodiments of the invention, what is claimed is:

1. The combination with a closed rotary kiln of internal heating devices adapted to be covered at least part of the time by the charge, of a valve, and means operated in unison with the rotation of the kiln for operating the valve to cause sudden and periodic releasing of the pressure generated in the kiln.

2. The combination with a closed rotary kiln of a longitudinal heating member within the kiln adapted to be within the body of the charge at least part of the time, of a valve, and means operated in unison with the rotation of the kiln for operating the valve to cause sudden and periodic releasing of the pressure generated in the kiln.

3. The combination with a closed rotary kiln of means for rotating it on an axis, of a longitudinal heating member lying between the axis and the periphery, and a valve, and means operated in unison with the rotation of the kiln for operating the valve to cause sudden and periodic releasing of the pressure generated in the kiln.

4. The combination with a closed rotary kiln of means for rotating it on an axis, of longitudinal heating members radially spaced from the axis so that each is within the charge at least part of the time during the rotation of the kiln, and a valve, and means operated in unison with the rotation of the kiln for operating the valve to cause sudden and periodic releasing of the pressure generated in the kiln.

5. The combination with a closed rotary kiln of means for rotating it on an axis, of longitudinal members extending lengthwise of the kiln and spaced from the axis, electric resistance heating coils on said members, and a valve, and means operated in unison with the rotation of the kiln for operating the valve to cause sudden and periodic releasing of the pressure generated in the kiln.

6. The combination with a closed rotary kiln, of a longitudinal heating member within the kiln adapted to be within the body of the charge at least part of the time, a closable opening for charging the kiln, means for releasing the pressure generated in the kiln quickly at regular intervals, and automatic devices operated in unison with the rotation of the kiln for operating said means.

7. The combination with a closed rotary kiln, of means for rotating it on an axis, of longitudinal heating members lying between the axis and the periphery, a valve for releasing the pressure generated in the kiln quickly at regular intervals of time, and automatic means operated in unison with the rotation of the kiln for intermittently opening the valve.

8. The combination with a closed rotary kiln, of an axial member on which it rotates, of longitudinal heating members extending lengthwise of the kiln and spaced from the axis, a valve on the periphery of the kiln for releasing the pressure generated in the kiln, and automatic means for intermittently opening the valve when it stands uppermost in the revolution of the kiln.

9. The combination with a rotary kiln, of an axial member on which it rotates, of heating members extending lengthwise of the kiln spaced from the sides thereof, a discharge port on the periphery of the kiln, and baffles springing from the periphery of the kiln adapted to feed the charge toward the port as the kiln discharges.

10. The combination with a rotary kiln having an axial member on which it rotates, of heating members extending lengthwise of the kiln spaced from the sides thereof, a discharge port on the periphery of the kiln, means for causing the contents to feed toward the port, a receptacle into which the calcined gypsum is discharged from the kiln, and cooling devices in the receptacle adapted to recover heat contained in the hot product.

WILLIAM LEON ELLERBECK.
LEWIS C. KARRICK.